(12) United States Patent
Belk et al.

(10) Patent No.: US 6,882,436 B2
(45) Date of Patent: Apr. 19, 2005

(54) NON-CONTACT HOLE DEPTH GAGE

(75) Inventors: John H. Belk, St. Louis, MO (US); Daniel E. Hulsey, Florissant, MO (US)

(73) Assignee: The Boeing Company, Chicago, IL (US)

( * ) Notice: Subject to any disclaimer, the term of this patent is extended or adjusted under 35 U.S.C. 154(b) by 620 days.

(21) Appl. No.: 10/021,263

(22) Filed: Dec. 7, 2001

(65) Prior Publication Data

US 2003/0107728 A1 Jun. 12, 2003

(51) Int. Cl.[7] .......................... G01B 11/00; G01C 3/08
(52) U.S. Cl. ...................... 356/626; 356/4.03; 356/624
(58) Field of Search ................................ 356/624, 625, 356/626, 609, 4.03, 4.01, 237.2, 237.6, 241.1

(56) References Cited

U.S. PATENT DOCUMENTS

| | | | |
|---|---|---|---|
| 4,314,760 A | 2/1982 | Hodge et al. | |
| 4,357,104 A | 11/1982 | Davinson | |
| 4,501,961 A | 2/1985 | Stauffer | |
| 4,518,253 A | 5/1985 | Takahashi | |
| 4,531,052 A | 7/1985 | Moore | |
| 4,549,207 A | 10/1985 | Boshier | |
| 4,767,211 A * | 8/1988 | Munakata et al. | .......... 356/624 |
| 4,787,739 A | 11/1988 | Gregory | |
| 4,798,469 A * | 1/1989 | Burke | .......... 356/609 |
| 4,886,347 A | 12/1989 | Monroe | |
| 4,935,613 A | 6/1990 | Ishiguro et al. | |
| 4,988,189 A | 1/1991 | Kroupa et al. | |
| 4,993,830 A | 2/1991 | Jarrett, Jr. | |
| 5,087,121 A * | 2/1992 | Kakuchi et al. | .......... 356/73 |
| 5,867,256 A | 2/1999 | Van Rheeden | |
| 6,392,744 B1 * | 5/2002 | Holec | .......... 356/4.03 |
| 6,538,751 B1 * | 3/2003 | Ono | .......... 356/614 |
| 6,806,969 B1 * | 10/2004 | Clifford et al. | .......... 356/360 |

* cited by examiner

*Primary Examiner*—Layla Lauchman
(74) *Attorney, Agent, or Firm*—Harness Dickey & Pierce P.L.C.

(57) ABSTRACT

Disclosed is a method that utilizes optics to measure a hole depth in a workpiece. The method involves placing a light recording apparatus and a light source apparatus proximate a hole. Light is then emitted from the light source apparatus and is directed into the hole. This illumination of the hole allows an image of the side surface of the hole that is at the greatest distance from the light recording apparatus to be recorded. Then, the apparent diameter of the image is calculated. The apparent diameter of the image, in turn, is compared to the known diameter of the hole in order to calculate the distance between a reference datum in the light recording apparatus and the far side surface of the hole. Once this distance is determined, the hole depth is calculated by accounting for the distance between the reference datum and the workpiece surface.

18 Claims, 4 Drawing Sheets

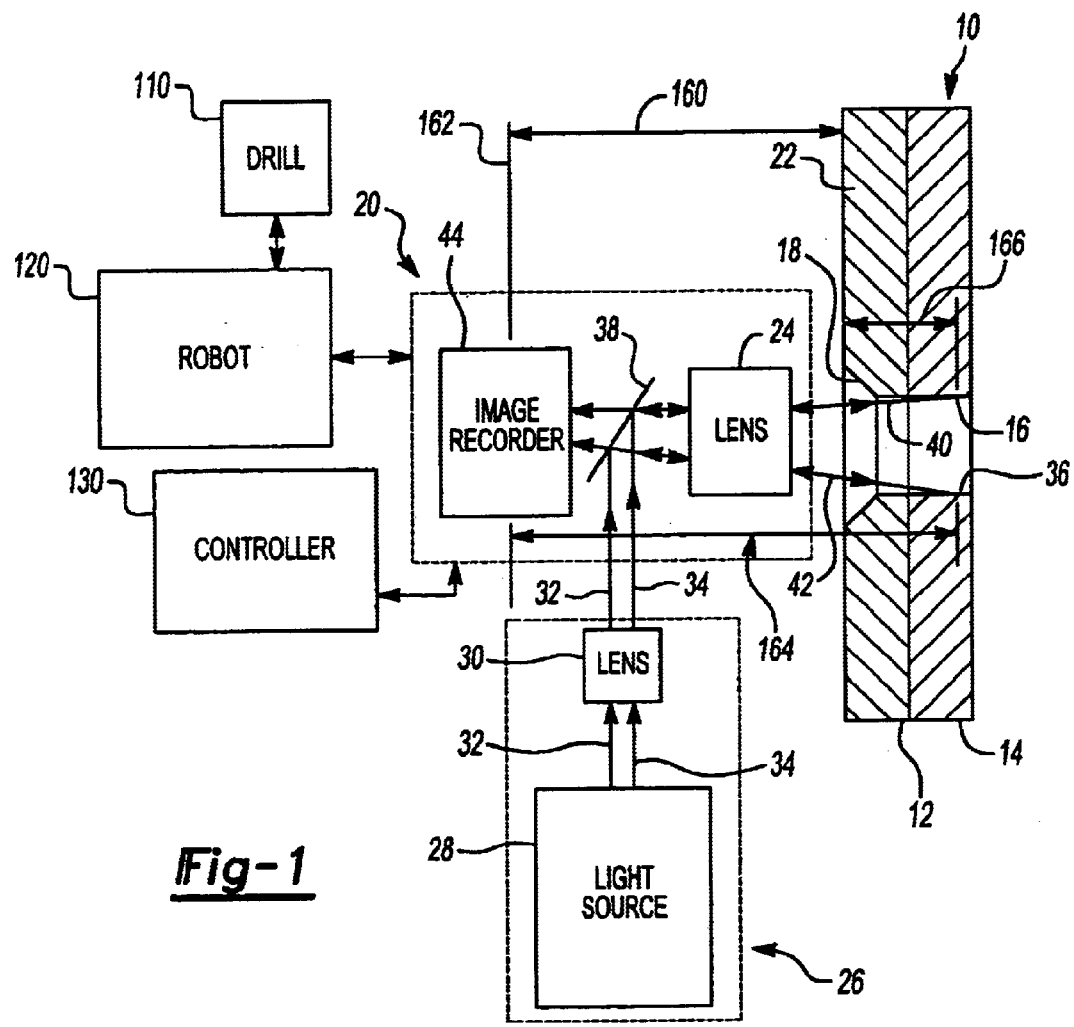
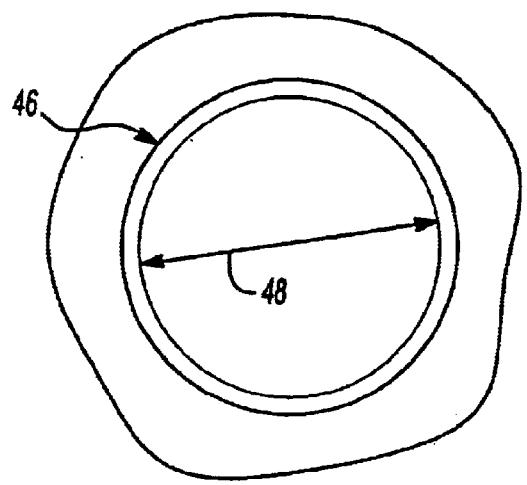

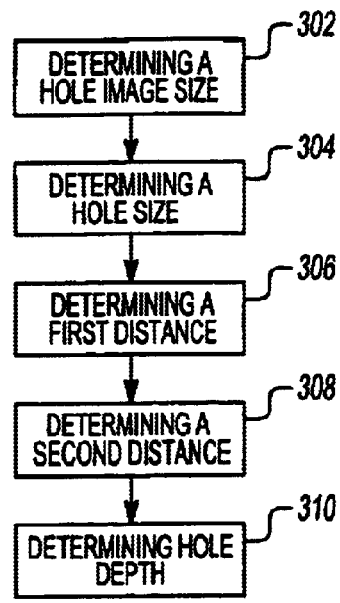
_Fig-3_
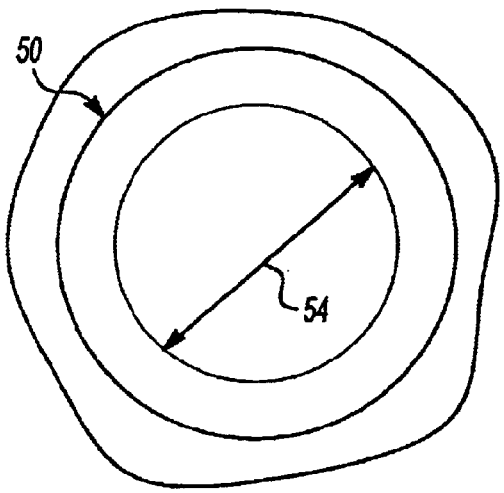
_Fig-4A_
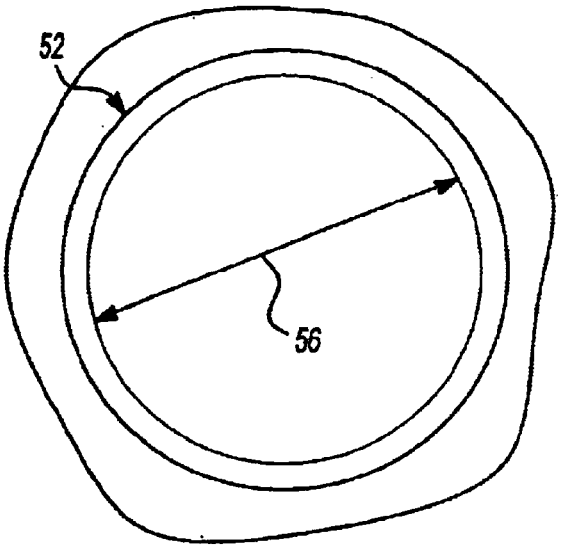
_Fig-4B_

US 6,882,436 B2

NON-CONTACT HOLE DEPTH GAGE

FIELD OF THE INVENTION

The present invention relates to estimating the depth of a hole by the use of optics.

BACKGROUND OF THE INVENTION

Every year, millions of holes are drilled into composite materials by the aircraft industry in order to join various structures together with fasteners. To join these structures efficiently, it is desirable to initially select a properly sized fastener. If the fastener that is selected is too long, then the fastener will need to be ground down, which will result in additional work. On the other hand, if the fastener length that is selected is too short, the fastener must be removed and replaced with a fastener of the appropriate length. Due to the nature of composite materials, the thickness of the materials to be joined often varies significantly from the nominal design size of the materials. Thus, in order to select the proper fastener length, it is desirable to know the approximate depth of the hole that has been created in the composite materials that are to be joined by the fastener.

A method of estimating the depth of the above-mentioned hole involves the use of feeler gages. These feeler gages can be manual or automatic. Although each of these feeler gages can adequately estimate the depth of the hole, both have undesirable limitations. For manual feeler gages, the undesirable feature is that they are inefficient because they require an operator to make a time consuming break in the manufacturing flow in order to measure the depth of the hole. This break in the manufacturing flow can be reduced by the use of automatic feeler gages that are attached to the robots that create the holes in the composite materials. Automatic feeler gages, however, are also not ideal because these feeler gages are susceptible to being broken during operation since they must physically contact the workpiece. Accordingly, it would be desirable to measure the depth of the hole using a process that does not involve physical contact with the hole.

SUMMARY OF THE INVENTION

In one preferred form, the present invention provides a method that utilizes optics to measure the depth of a hole that has been drilled in a workpiece. The method involves placing a light recording apparatus proximate the drilled hole at a predetermined distance from a surface of the workpiece and placing a light source apparatus proximate the hole. Light is emitted from the light source apparatus and directed into the hole in order to illuminate the side surface of the hole that is at the greatest distance from the light recording apparatus. By illuminating this far side surface of the hole, an image of the far side surface of the hole can be recorded using the light recording apparatus.

Then, using the image of the side surface of the hole, the apparent diameter of the hole can be calculated. This apparent diameter, in turn, can be compared to the known diameter of the hole in order to calculate the distance between the light recording apparatus and the side surface of the hole that is the greatest from the light recording apparatus. Once this distance is determined, the hole depth can be calculated by simply subtracting the distance between the light recording apparatus and the surface of the workpiece from the distance that has been previously calculated.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a schematic of a hole depth measuring apparatus constructed and operated in accordance with the teachings of the present invention;

FIG. 2 is an exemplary image of a hole side surface recorded by the depth measuring apparatus of FIG. 1;

FIG. 3 is a schematic illustration in flow chart form of one embodiment of the method of the present invention;

FIGS. 4A and 4B are views similar to that of FIG. 2 but illustrating changes in the image that are related to the depth of the hole;

DETAILED DESCRIPTION OF THE PREFERRED EMBODIMENTS

Figure 5:
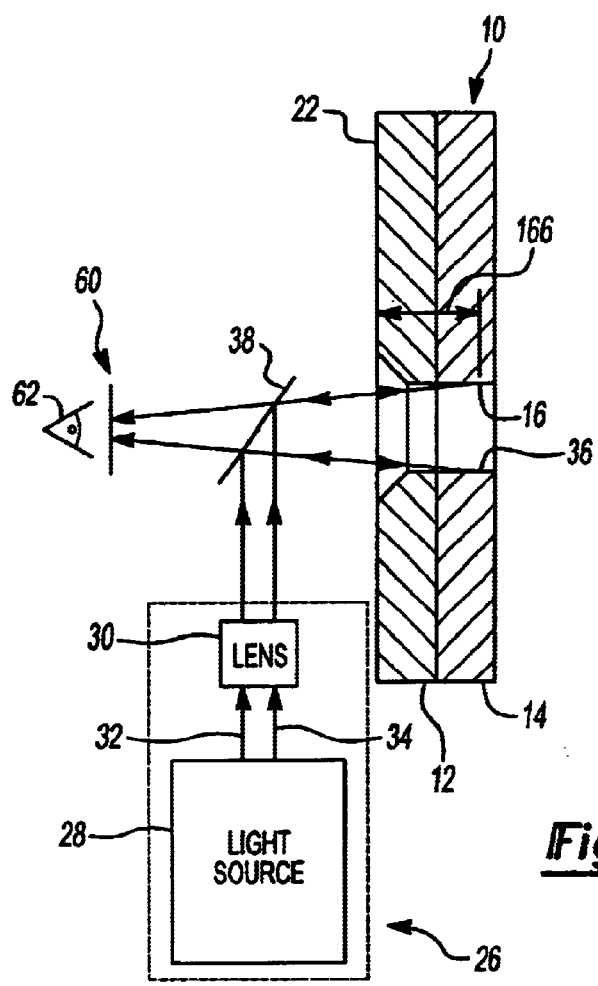
FIG. 5 is a schematic view similar to that of FIG. 1 but illustrating a hole depth measuring apparatus constructed in accordance with the teachings of an alternate embodiment of the present invention.

The following description of the preferred embodiment is merely exemplary in nature and is in no way intended to limit the invention, its application, or uses.

Referring to FIG. 1, a workpiece 10 is comprised of a first material 12 and a second material 14 which are to be joined together by means of a fastener that is not shown. Those skilled in the art will understand that the workpiece 10 is merely exemplary and is not intended in any way to limit the scope of the present invention. In this regard, those skilled in the art will understand that the workpiece may be constructed in a manner so as to include a multiciplicity of layers, which may or may not be formed from different materials, and/or special function materials, such as films or pastes, for example, that are configured to fill gaps, thwart corrosion and/or alter characteristics such as chemical resistance and coefficient of friction. To join the first material 12 to the second material 14 with a fastener, a hole 16 with a countersink 18 is created in the workpiece 10. Those skilled in the art will understand that the countersink 18 may be omitted if desired, or substituted with various other types of slots, counterbores or shaped recesses. In a preferred embodiment, the hole 16 is created by a drill 110 that is attached to a robot 120.

After the hole 16 has been created in the workpiece 10, a light recording apparatus 20, which in a preferred embodiment is also attached to the robot 120, is placed proximate the hole 16 at a predetermined distance away from the workpiece surface 22. In a preferred embodiment when placing the light recording apparatus 20 proximate the hole 16, the optical axis of a light recording apparatus is oriented generally parallel to the axis of the hole 16. However, the optical axis of a light recording apparatus may also be oriented at an angle form the axis of hole 16. In a preferred embodiment, the light recording apparatus is a digital camera. However, other well-known conventional light recording apparatuses, such as a conventional camera, a reticle and a human eye, or the like, may also be used.

To illuminate the hole 16, a light source apparatus 26 is placed proximate the hole 16. In a preferred embodiment, the light source apparatus 26 is comprised of a light source 28, which emits light, and a lens 30 that focuses the light, represented by light paths 32 and 34, that is emitted from the light source 28. The light emitted from light source 28 is gathered by lens 30 in order to increase the amount of light that reaches a hole far side surface 36. After the light emitted from the light source 28 passes through lens 30, the light, as represented by light paths 32 and 34, is directed through a beam splitter 38.

The beam splitter 38 serves the purpose of redirecting the light emitted from the light source 28 along a path, as represented by light paths 40 and 42, that is generally parallel to the axis of hole 16. In a preferred embodiment, the beam splitter 38 is contained within the light recording apparatus 20 and light emitted from the light source 28 is sent into the light recording apparatus 20. As shown in FIG. 1, the light recording apparatus lens 24 is located between the beam splitter 38 and the hole 16. Preferably, the path of the light is centered on the beam splitter 38 so as to prevent light from traversing around the beam splitter 38 or light recording apparatus lens 24 on its way to the hole 16. As those skilled in the art will readily understand, the light recording apparatus lens 24 may be positioned between the beam splitter 38 and the image recorder 44. Furthermore, the positions of the light source 28 and the light recording apparatus 20 may be swapped in any of the aforementioned configurations, and the beam splitter 38 may be replaced by a mirror which reflects the light from the light source 28 along paths close to 40 and 42, the mirror having an aperture or other space through which the light that returns from the sides of the hole 16 is permitted to pass and meet the light recording apparatus 20.

Once the light has been redirected by the beam splitter 38 towards the hole 16, it travels along a path as represented by light paths 40 and 42 and illuminates the hole far side surface 36. Some of the light that reaches the hole far side surface 36 will be reflected off the hole far side surface 36, travel back along light paths proximate the light paths 40 and 42, and pass through the light recording apparatus lens 24 to a light-sensitive image recorder 44, which is used to record an image 46, as shown in FIG. 2, of the hole far side surface 36. The light-sensitive image recorder 44 may provide a permanent record of the image, such as a photograph or a video image, or may simply provide a transient image, via a set of lenses, for example, that exists only as long as the hole depth measurement device (i.e., the light source 28, the light recording apparatus 20, et al.) are maintained in their position and actively enabled to generate, record or otherwise process the light beam in the manner described above.

In FIG. 3, the methodology of the present invention is illustrated in flow chart form. With additional reference to FIGS. 1 and 2, the methodology begins at block 302 where a hole image size (i.e., the image diameter 48) is determined. A controller 130 that is connected to the light recording apparatus 20 employs photo-processing software that is programmed to determine the image diameter 48. The methodology then proceeds to block 304.

In block 304, a hole size, which is indicative of the diameter of the hole 16, is determined. Generally, the hole size will be known because the hole 16 is typically formed to a pre-specified diameter. If the diameter of the hole 16 is not known, it is possible to determine the hole size by recording an image of a side surface of the hole 16 that is near the workpiece surface 22 and using this image to calculate to the diameter of hole 16. The methodology then proceeds to block 306.

In block 306, a first distance 160, which is indicative of the distance between the workpiece surface 22 and a reference datum 162 that is located in the light recording apparatus 20 (e.g., the datum could by located at the image recorder 44), is determined. Generally, the first distance 160 will be known because the light recording apparatus 20 has been placed a predetermined distance from the workpiece surface 22 and the distance from the reference datum 162 to a surface of the light recording apparatus is known. The methodology then proceeds to block 308.

In block 308, a second distance 164, which is indicative of the distance between the reference datum 162 and the hole far side surface 36, is calculated utilizing the hole image size, which was determined in block 302, and the hole size, which was determined in block 304. The controller 130 is programmed to perform this calculation.

To understand how the second distance 164 is calculated, the optical principle that this calculation is based upon will be described with reference to FIGS. 4A and 4B, which illustrate a first hole image 50 and a second hole image 52, respectively. The first hole image 50 and the second hole image 52 are recorded images of the far side surface of two holes with the same diameter but with different depths. Furthermore, both recorded images of the first hole image 50 and the second hole image 52 were taken by a light recording apparatus that was located at the same distance (i.e., the first distance for both images is constant) from the workpiece surface when each image was recorded.

As is readily apparent, the first hole image diameter 54, which is an image of the far side surface of the hole with a greater depth, is less than the second hole image diameter 56. In other words, the hole image size, which is the diameter of the image of the far side surface of a hole, will be a function of the depth of the hole. Thus, given a known hole diameter (i.e., the hole size) and a hole image size, the second distance, which is indicative of the distance between a reference datum in the light recording apparatus and the hole far side surface, can be calculated.

Referring back to FIG. 3, the methodology then proceeds to block 310. With additional reference to FIG. 1, in block 310, the estimated hole depth 166 is calculated by subtracting the first distance, which was determined in block 306, from the second distance, which was determined in block 308. The controller 130 is programmed to perform this calculation.

Referring to FIG. 5, a hole depth measuring apparatus constructed in accordance with the teachings of another embodiment of the present invention is illustrated wherein like elements are indicated and/or referred to by the previously employed reference numerals. A reticle 60 is placed proximate a hole 16 at predetermined distance from the workpiece surface 10. A light source apparatus 26 is placed proximate the hole 16. The light source apparatus 26 is comprised of a light source 28 and a lens 30 for gathering the light as represented by light paths 32 and 34 that is emitted from the light source 28. A beam splitter 38, which redirects the light emitted from the light source 28 along an axis generally parallel to the axis of the hole 16, is placed in the path of light as represented by light paths 32 and 34.

Figure 6:
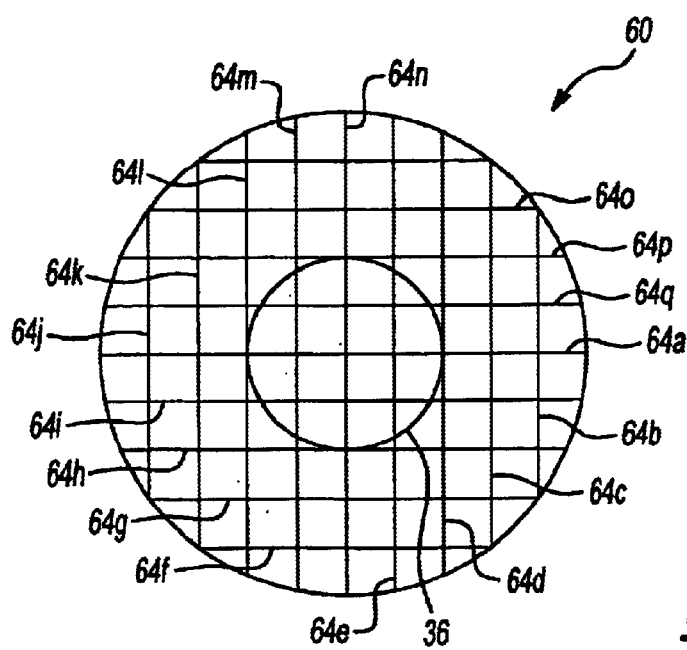
FIG. 6 is a view that illustrates observing a hole through a reticle.

Because the light illuminates a hole far side surface 36, an observer 62 can view the hole far side surface 36 through the reticle 60. With additional reference to FIG. 6, by viewing the hole far side surface 36 through the reticle 60 the observer, using reticle lines 64A–64Q, can determine a hole image size, which is indicative of the apparent diameter of the hole 16. Once the hole image size is determined by the observer 62, the hole depth 166 can be determined using a method similar to the one shown in FIG. 3.

While the method of the present invention has been described thus far as having the light recording apparatus 20 placed a predetermined known distance away from the workpiece surface 22, those skilled in the art will appreciate that the invention, in its broader aspects, may be performed somewhat differently. For example, the light recording apparatus 20 may, in the alternative, be placed at an unknown distance from the workpiece surface 22. In this situation, images for the near and far sides of the hole 16 are taken and compared. As the diameter of the hole 16 is known, the image of the near side of the hole 16 can be accurately scaled to determine the depth of the hole 16.

Figure 7:
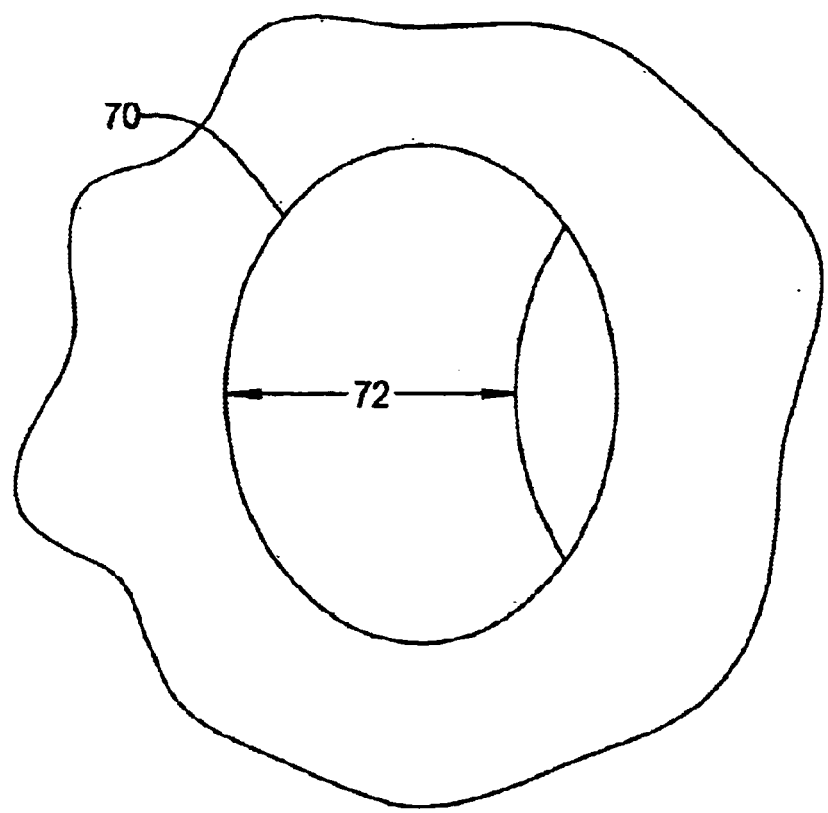
FIG. 7 is an exemplary image of a hole side surface recorded by a depth measuring apparatus constructed in accordance with a third embodiment of the present invention.

In a third such variation, the optical axis of the light recording apparatus may be placed at an angle to the axis of the hole such that the image looks similar to FIG. 7. In this case the hole depth is calculated based on the angle of the optical axis, the position of the hole image 70 in the field of view, and the image length 72.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A method for estimating the depth of a hole through a workpiece, the method comprising the steps of:
   providing a light recording apparatus;
   placing the light recording apparatus at a predetermined first distance away from a surface of the workpiece proximate the hole;
   providing a light source apparatus;
   illuminating a side surface of the hole with a light emitted from the light source apparatus;
   recording an image of a far side surface of the hole with the light recording apparatus;
   determining a hole image size indicative of a diameter of the image;
   determining a hole size indicative of a diameter of the hole;
   employing the hole image size and the hole size to calculate a second distance indicative of a distance between the light recording apparatus and the far side surface of the hole; and
   determining the depth of the hole by subtracting the first distance from the second distance.

2. The method of claim 1, wherein the hole size is determined based on a diameter of a drill bit that was used to create the hole in the workpiece.

3. The method of claim 1, wherein the hole size is determined based on a hole image size of a near edge surface of the hole.

4. The method of claim 1, further comprising the step of placing a device in the path of light emitted from the light source apparatus to generally align the emitted light with an axis of the hole.

5. The method of claim 4, wherein the device is selected from a group consisting of beam splitters and mirrors.

6. The method of claim 5, wherein the beam splitter or mirror is located within the light recording apparatus.

7. The method of claim 1, wherein the light source is placed on the same side of the hole as the light recording apparatus.

8. A method for estimating the depth of a hole in a surface of a workpiece, the method comprising the steps of:
   providing a reticle;
   placing the reticle at a predetermined first distance away from the surface of the workpiece proximate the hole;
   providing a light source apparatus;
   illuminating a side surface of the hole with a light emitted from the light source apparatus;
   viewing an image of a far side surface of the hole through the reticle;
   determining a hole image size indicative of a diameter of the image;
   determining a hole size indicative of a diameter of the hole;
   employing the hole image size and the hole size to calculate a second distance indicative of a distance between the reticle and the far side surface of the hole; and
   determining the depth of the hole by subtracting the first distance from the second distance.

9. The method of claim 8, further comprising the step of placing a device in the path of light emitted from the light source apparatus to generally align the emitted light with an axis of the hole.

10. The method of claim 9, wherein the device is selected from a group consisting of beam splitters and mirrors.

11. The method of claim 8, wherein the light source is placed on the same side of the hole as the light recording apparatus.

12. An apparatus for estimating a depth of a hole drilled in a surface of a workpiece, comprising:
    a robot;
    a drill, the drill coupled to the robot and operable for forming the hole;
    a light recording apparatus, the light recording apparatus coupled to the robot, the light recording apparatus being operable for obtaining an image of a far side surface of the hole; and
    a controller, the controller evaluating a size of the image, a distance between the surface of the workpiece and the light recording apparatus, and an actual size of the hole and determining the depth of the hole.

13. The apparatus of claim 12, further comprising a light source apparatus, the light source apparatus coupled to the robot.

14. A method for estimating the depth of a hole through a workpiece, the method comprising the steps of:
    providing a light recording apparatus;
    placing the light recording apparatus at a predetermined first distance away from a surface of the workpiece proximate the hole such that an optical axis of the light recording apparatus is positioned at a predetermined angle from an axis of the hole;

providing a light source apparatus;

illuminating a side surface of the hole with a light emitted from the light source apparatus;

recording an image of a side surface of the hole with the light recording apparatus;

determining a hole image position indicative of a location of the light recording apparatus;

determining a hole side image length indicative of a projected depth of the hole; and employing the first distance, the optical axis of the light recording apparatus, the hole image position and the hole side image length to calculate the depth of the hole.

15. The method of claim 14, further comprising the step of placing a device in the path of light emitted from the light source apparatus to generally align the emitted light with the axis of the hole.

16. The method of claim 15, wherein the device is selected from a group consisting of beam splitters and mirrors.

17. The method of claim 16, wherein the beam splitter or mirror is located within the light recording apparatus.

18. The method of claim 14, wherein the light source is placed on the same side of the hole as the light recording apparatus.

* * * * *